Dec. 8, 1959 P. R. GILSON 2,916,728

MAGNETIC RECORDING AND READING SYSTEMS

Filed Nov. 18, 1955 2 Sheets-Sheet 1

INVENTOR.
PAUL R. GILSON
BY
Christie, Parker & Hale
ATTORNEYS

MAGNETIC RECORDING AND READING SYSTEMS

Filed Nov. 18, 1955 2 Sheets-Sheet 2

INVENTOR.
PAUL R. GILSON
BY
Christie, Parker & Hale
ATTORNEYS

United States Patent Office 2,916,728

Patented Dec. 8, 1959

2,916,728

MAGNETIC RECORDING AND READING SYSTEMS

Paul R. Gilson, West Covina, Calif., assignor, by mesne assignments, to Burroughs Corporation, Detroit, Mich., a corporation of Michigan Application November 18, 1955, Serial No. 547,761

9 Claims. (Cl. 340—174)

This invention relates to magnetic recording and reading systems, and more particularly to an improved combined magnetic recording and reading circuit.

In high speed data processing systems, it is commonplace to store information by variably magnetizing a track along a magnetizable medium. For example, binary coded digital information may be stored by passing a magnetizable medium adjacent a transducer which is adapted to change the condition of magnetization of the magnetizable medium between two distinct levels in accordance with electrical signals applied to the transducer which represent the binary information. When it is desired to derive the stored information, the magnetized track is passed adjacent a transducer across which appear electrical signals corresponding to the variations in magnetization.

In many data processing systems it is desirable to alternate between recording signals on the magnetizable medium and reading previously recorded signals from the magnetizable medium. Where the same transducer is used for both recording and reading, it is common practice to use a combined circuit which is adapted both to energize the transducer with relatively large signals for recording, and to amplify relatively small signals appearing across the transducer during a reading interval. In such a circuit, the signals being recorded are applied directly to the reading amplifier. Since the reading amplifier normally is adapted to handle relatively small signals, the amplifier becomes overloaded during a recording operation. Due to the overloading, a period of time is required after recording for the reading amplifier to recover before a reading operation can proceed.

Where information is being recorded in blocks along a continuously moving magnetizable medium, and it is necessary to switch from recording to reading between blocks, relatively large buffer spaces must be left unrecorded between the blocks to allow for the period of recovery of the reading amplifier. Accordingly, the amount of information which can be stored is substantially diminished.

Another defect commonly found in conventional magnetic recording systems is the generation of spurious signals in the transducers during a reading operation. The spurious signals are frequently caused by the pickup of stray magnetic fields by the transducers. Where the signal level of the information being derived is relatively low, the spurious signals sometimes obliterate the information being derived.

In accordance with the present invention, a new and improved combined recording and reading circuit for use in a magnetic recording system is provided in which the transient interval required for the reading amplifier to recover after a writing operation is substantially reduced, and in which spurious signals generated in the transducer during a reading operation are substantially eliminated.

In accordance with one embodiment of the invention, two similar transducers are energized in parallel from a source of signals and a differential amplifier is connected to the transducers to provide substantially zero signal output during a recording operation. During a reading operation the transducers are effectively disconnected from the source of signals and the differential amplifier provides an output signal representing the net difference between the signals generated by the first transducer and the signals generated by the second transducer. By engaging only one of the transducers with the magnetizable medium at a time, the net signal appearing at the output of the differential amplifier represents the signal generated by the transducer engaged with the magnetizable medium less any spurious signals having a like effect on both transducers.

Details of the construction and operation of one embodiment of the invention are contained in the following description which should be taken in conjunction with the drawings, in which.

Figure 1:
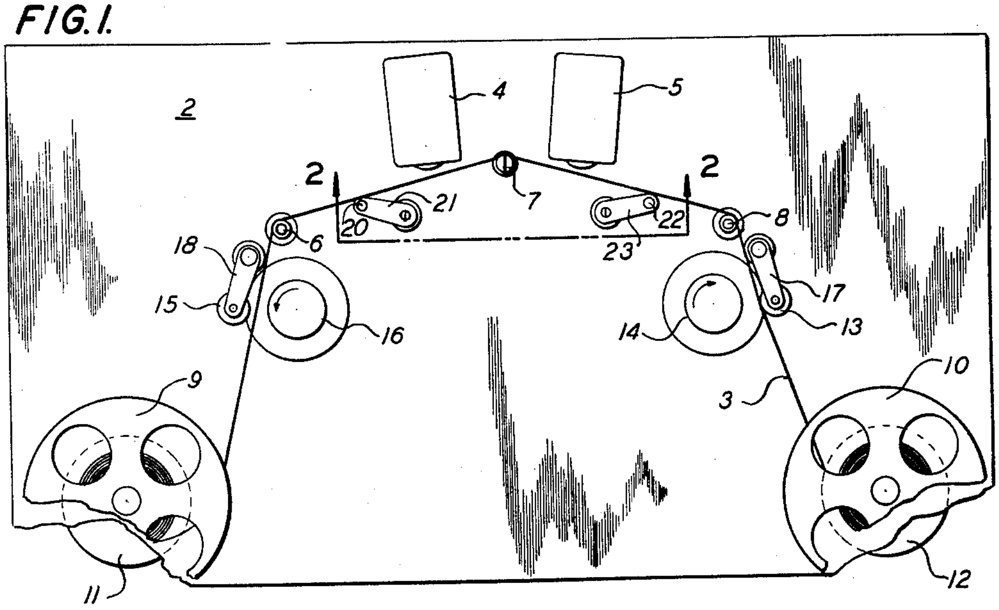
Fig. 1 is an elevational view of a tape transport system for use in conjunction with the present invention.
Figure 2:
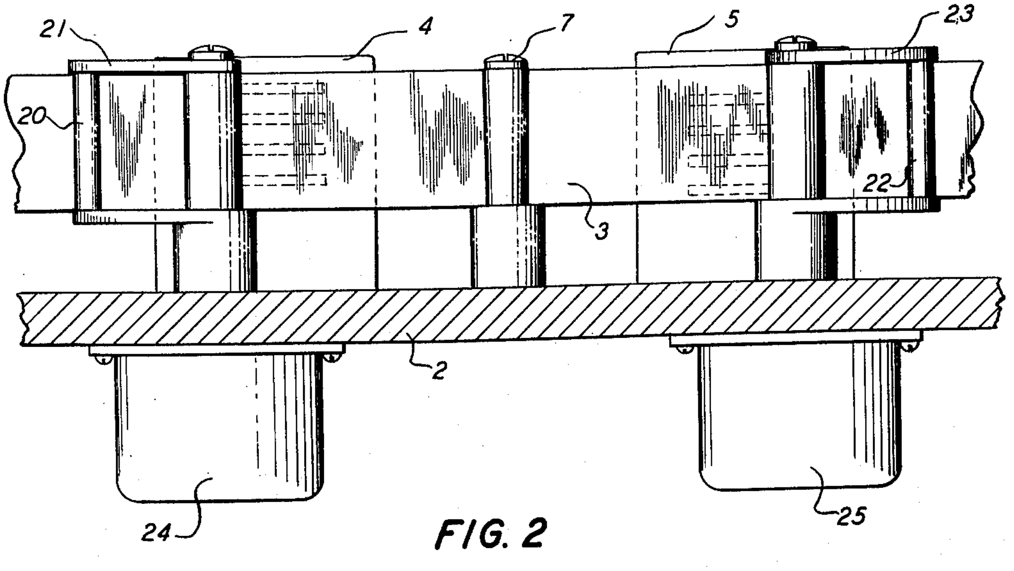
Fig. 2 is a sectional view taken along line 2—2 of Fig. 1.

The tape transport system of Figs. 1 and 2 is adapted to pass a magnetizable tape 3 through an operational zone past the magnetic recording heads 4 and 5 which are mounted on a frame 2. Each of the magnetic recording heads 4 and 5 includes transducers which are adapted to magnetize the tape 3 in accordance with electrical information signals. By means of the transducers of the magnetic recording heads 4 and 5, adjacent tracks on the tape 3 may be individually recorded.

In order to increase the amount of information which may be recorded on the tape 3, the transducers of the magnetic recording heads 4 and 5 are arranged to record and read from tracks on the tape 3 which are interleaved. Thus, with respect to the tracks on the tape 3, the magnetic recording head 4 records every other track, while the magnetic recording head 5 records tracks located between and adjacent those which are recorded by the magnetic recording head 4.

The tape 3 is guided through the operational zone by means of the tapered guide pins 6, 7 and 8 mounted on the frame 2. The ends of the tape 3 are stored in a pair of reels 9 and 10 which are individually driven in conventional fashion by means of the reversible reel drive motors 11 and 12.

The direction of tape transport is determined by means of the idler rollers 13 and 15 which are journalled in the actuating arms 17 and 18 respectively. The actuating arms 17 and 18 are pivotally mounted on the frame 2 and are adapted to engage the idler rollers selectively with the capstans 14 and 16. When the idler roller 13 is engaged with the capstan 14, the tape 3 is driven from the reel 9 through the operational zone towards the reel 10. In like manner, when the idler roller 15 is engaged with the capstan 16, the tape 3 is driven from the reel 10 towards the reel 9. The capstans 14 and 16 may be rotatably driven in opposite directions from a suitable motor (not shown) mounted on the rear of the frame 2.

When it is desired to record or read from the tracks on the tape 3 with which the transducers of one of the magnetic recording heads are associated, the tape 3 may be elevated into contact with the pole pieces of the recording head 4 by means of an idler roller 20 which is journalled in a lift arm 21. In like manner, when it is desired to record on the tracks associated with the transducers of the magnetic recording head 5, the tape 3 may be elevated into contact with the pole pieces of the magnetic recording head 5 by means of an idler roller 22 which is journalled in a lift arm 23.

The lift arms 21 and 23 may be elevated by means of the rotary solenoids 24 and 25. In like manner, the actuating arms 17 and 18 may be engaged with the capstans 14 and 16 by means of rotary solenoids (not shown).

In operation, the tape 3 is elevated into contact with the pole pieces of only one of the magnetic recording heads 4 and 5 at a time. Therefore, although signals may be applied to similar ones of the transducers of both of the magnetic recording heads 4 and 5, only the recording head with which the tape is engaged will function to record a track on the tape 3.

Figure 3:
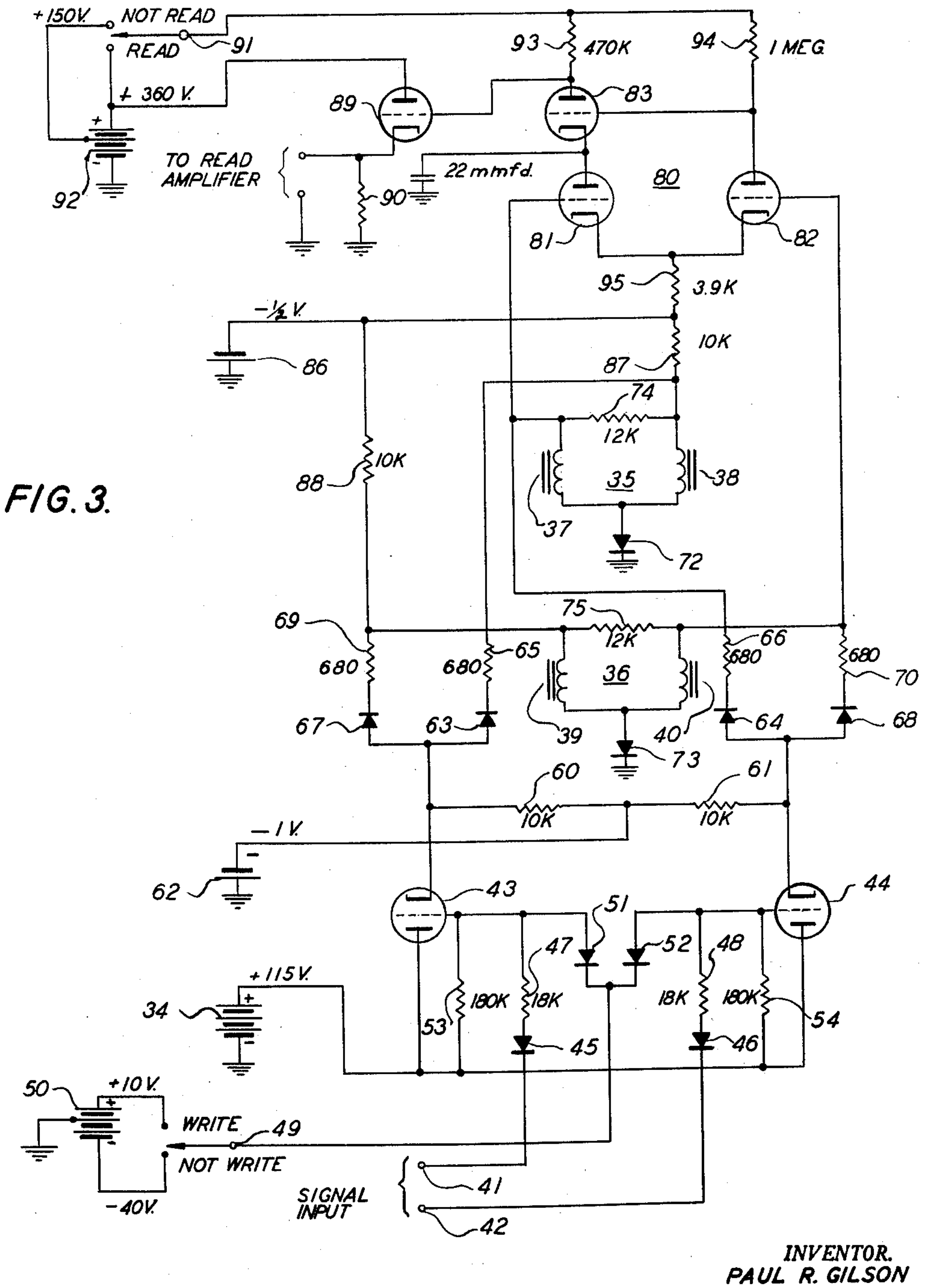
Fig. 3 is a schematic circuit diagram of a combined circuit for recording and reading from a magnetizable record in accordance with the invention.

Fig. 3 is a schematic circuit diagram of a combined circuit for energizing a like transducer from each of the magnetic recording heads 4 and 5 of Fig. 1. In the case where each of the magnetic recording heads has a total of four separate transducers for recording four separate tracks on the tape, a corresponding number of circuits as shown in Fig. 3 is required.

In Fig. 3, the like transducers 35 and 36 each have a pair of windings 37, 38 and 39, 40, respectively. During a recording operation a signal to be recorded may be applied to the terminals 41 and 42. Where a signal representing a binary 1 is to be recorded, the potential applied to the terminal 41 will be positive, e.g. plus 10 volts, and the potential applied to the terminal 42 will be negative, e.g. minus 40 volts. Conversely, when the signal to be recorded represents a binary 0, the voltage applied to the terminal 41 will be negative, while the voltage applied to the terminal 42 will be positive. Therefore, the voltages applied to the terminals 41 and 42 will be alternately and oppositely positive or negative, depending upon the value of the binary digital signal being recorded.

The electron tubes 43 and 44 are energized from a source of potential 34. By means of the biasing resistors 53 and 54, the control electrodes of the electron tubes 43 and 44 are held at a relatively high potential when the diodes 45, 46, 51 and 52 are non-conducting. The diodes 51 and 52 are held non-conducting when a switch 49 is placed in "Write" position in which a positive potential is derived from a source of potential 50. However, when the switch 49 is in "Not Write" position, a negative potential is applied to the diodes 51 and 52 which causes current to be drawn through the resistors 53 and 54, thereby causing the control electrodes to cut off current flow in the electron tubes 43 and 44. During a recording operation, in which the switch 49 is placed in "Write" position, the signals applied to the terminals 41 and 42 control the potentials of the control electrodes of the electron tubes 43 and 44 via the diodes 45 and 46 and the resistors 47 and 48. That is, when the signals applied to the terminal 41 represent a binary 1, the diode 45 is substantially cut-off, while the diode 46 is conducting.

As a consequence, the electron tube 43 is rendered conducting while the electron tube 44 is rendered substantially non-conducting. In converse fashion, the application of signals representing a binary 0 to the terminals 41 and 42 results in the electron tube 43 being rendered substantially non-conducting, while the electron tube 44 is rendered conducting.

The electron tubes 43 and 44 are connected to the cathode resistors 60 and 61 which are biased slightly negatively from a source of potential 62. The signals appearing across the cathode resistors 60 and 61 are applied to the windings 37 and 38 of the transducer 35 via the diodes 63 and 64 and the current limiting resistors 65 and 66. In like manner, the signals appearing across the cathode resistors 60 and 61 are applied to the windings 39 and 40 of the transducer 36 via the diodes 67 and 68 and the current limiting resistors 69 and 70. Thus, the transducers 35 and 36 are driven in parallel from the cathodes of the electron tubes 43 and 44. However, since only one of the electron tubes 43 and 44 is conducting at any one time, only one of the windings of each of the transducers 35 and 36 will be energized at a time. That is, when a binary 1 is being recorded, the voltage appearing at the cathode of the electron tube 43 is relatively high in potential, causing current to flow through the diode 72 via the winding 38 of the transducer 35 and current to flow through the diode 73 via the winding 39 of the transducer 36.

Conversely, when a binary 0 is being recorded, current will flow through the diodes 72 and 73 via the windings 37 and 40. A resistor 74 may be connected across the windings of the transducer 35 and a resistor 75 may be connected across the windings of the transducer 36 to damp any oscillations which may appear across the windings during transient intervals in which the signal being recorded changes between binary digital values.

Connected to the transducers 35 and 36 is a differential amplifier 80 which includes the electron tubes 81, 82 and 83. The circuit is arranged so that the output appearing at the anode of the electron tube 83 represents the net difference between the signals applied to the control electrodes of the electron tubes 81 and 82. Signals appearing across the windings of the transducer 35 are applied to the control electrode of the electron tube 81 while signals appearing across the transducer 36 are applied to the control electrode of the electron tube 82.

Since the signals applied to the transducers 35 and 36 are alike during a recording operation, the signals applied to the control electrodes of the electron tubes 81 and 82 are also alike. Consequently, the output appearing at the anode of the electron tube 83 will be substantially zero during a writing operation.

As noted previously, when a writing signal is applied to a reading amplifier, the amplifier is substantially overloaded and requires a relatively long period to recover before a reading operation can proceed. However, since the net output from the differential amplifier 80 is substantially zero during a writing operation, the time required to switch between a writing and a reading operation is substantially lessened through the use of the circuit of Fig. 3.

During a reading operation the switch 49 is placed in the "Not Write" position, thereby maintaining the electron tubes 43 and 44 non-conducting. The diodes 63, 64, 67 and 68 are maintained non-conducting during a reading operation by the negative bias derived from the source of potential 62. Likewise, a small negative bias derived from a source of potential 86 maintains non-conducting the diodes 72 and 73 associated with the windings in the transducers 35 and 36. Consequently, during a reading operation, the windings 37 and 38 of the transducer 35 are connected serially with a resistor 87 between the control electrode of the electron tube 81 and ground reference potential. In a similar manner, the windings 39 and 40 of the transducer 36 are connected serially with a resistor 88 between the control electrode of the electron tube 82 and ground reference potential. The result is that the signals appearing across the transducer 35 are applied to one input of the differential amplifier 80, i.e. the control electrode of the electron tube 81, and the signals appearing across the transducer 36 are applied to the other input of the differential amplifier 80, i.e. the control electrode of the electron tube 82.

As previously noted, the differential amplifier 80 is adapted to provide an output signal which represents the net difference between the signals applied to the control electrodes of the electron tubes 81 and 82. Since the magnetizable recording medium is engaged with only one of the transducers 35, 36 at a time, information signals will be generated in only one of the transducers. However, any stray fields or spurious signals having a like effect on both the transducers 35 and 36 are applied to the differential amplifier 80 in such a way that they are substantially eliminated from the output. Therefore, the output of the differential amplifier appearing at the anode of the electron tube 83 substantially represents information signals only.

In order to provide a low impedance output, the signal from the anode of the electron tube 83 may be applied to a cathode follower electron tube 89. The output signal appearing across a cathode resistor 90 may be applied to a succeeding amplifier in conventional fashion. Where the cathode resistor 90 associated with the cathode follower electron tube 89 is shared by other circuits similar to Fig. 3, as for example, where several separate recording units are selectively connected to a common output, the differential amplifier 80 may be disabled by means of a switch 91 which is adapted to apply a suitable positive operating voltage to the electron tubes 81, 82 and 83 in the "Read" position and is adapted to lower the operating potential in the "Not Read" position. Suitable operating potentials for the cathode follower electron tube 89, as well as the differential amplifier electron tubes 81, 82 and 83 may be derived from a source of potential 92. Conventional load resistors 93 and 94 are connected in the anode circuits of the electron tubes 82 and 83 and a common cathode resistor 95 is shared by the electron tubes 81 and 82.

For convenience of illustration the sources of operating potential for the circuit of Fig. 3 have been illustrated by conventional battery symbols. It will be appreciated that the operating and bias voltages may be derived from a suitable electronic power supply. In addition, it will be appreciated that each of the electron tubes in the circuit of Fig. 3 includes a heater winding (not shown) for heating its associated cathode. The heater windings may be energized from a source of alternating current in conventional fashion.

Although specific values have been given for the circuit components of Fig. 3, it is intended that the values be taken as exemplary, being indicative only of one workable embodiment. The values of the resistors are given in ohms where k=1000 and meg=1 megohm, the values of the potentials are given in volts (v.), and the value of the capacitor is given in micromicrofarads (mmfd.). In the illustrative embodiment of Fig. 3, a type 5687 electron tube may be used for electron tubes 43 and 44, a type 12AX7 tube may be used for the differential amplifier electron tubes 81 and 82, and a type 5963 tube may be used for the electron tubes 83 and 89.

I claim:

1. In a magnetic recording system in which at least two transducers are adapted to record alternately at selected times, the combination of means transporting a magnetizable medium past said transducers, means positioning a selected one of the transducers and the magnetizable medium in close proximity, means applying signals to be recorded to both of said transducers simultaneously, a differential amplifier coupled to said transducers for providing an output signal representing the net difference between the signals appearing across the transducers, and means selectively disabling said signal applying means.

2. In a magnetic recording system in which at least two balanced transducers are adapted to record a magnetizable medium selectively, the combination of means similarly energizing said transducers with recording signals, and a differential amplifier coupled to said transducers for providing an output signal representing the net difference between the signals appearing across the transducers.

3. In a tape recording system, the combination of a pair of similar transducers adapted to record selectively and alternately adjacent channels on said tape, means for causing said tape and one only of said pair of transducers to be brought into operative engagement, means similarly energizing both of said transducers with recording signals, an output circuit coupled to said transducers, and means cancelling from said output circuit like signals appearing across said transducers.

4. In a magnetic tape recording system, the combination of a pair of similar transducers for recording a magnetizable tape, means alternately and selectively engaging said tape with said transducers, means balancing the signal appearing across one of the transducers against the signal appearing across the other of the transducers, and means energizing said transducers in like fashion from a source of signals to be recorded.

5. In a magnetic tape recording system, the combination of a pair of like transducers, a recording circuit for energizing said transducers in parallel, a differential amplifier coupled to said transducers for providing an output signal representing the net difference in signals appearing across said transducers, and means for selectively positioning one only of said transducers in close proximity with a magnetizable medium during recording and reading.

6. In a magnetic recording system which is adapted to record selectively on a magnetizable medium and read previously recorded signals from the magnetizable medium, the combination of a pair of similar transducers, each of which is adapted to record and read from the magnetizable medium; a source of signals to be recorded; means coupling the transducers in parallel across the source of signals to be recorded during a recording operation; a differential amplifier having a pair of signal input terminals; said differential amplifier being adapted to provide an output signal representing the net difference between signals applied to said input terminals; means coupling said transducers and said source of signals to be recorded to said differential amplifier during a recording operation, whereby said differential amplifier provides substantially zero signal output during a recording operation; and means coupling said transducers only to said differential amplifier during a reading operation, whereby said differential amplifier provides an output signal substantially representing the net difference between the signals appearing across said transducers during a reading operation.

7. In a magnetic recording system which is adapted to record selectively on a magnetizable medium and read previously recorded signals from the magnetizable medium, the combination of a pair of similar transducers, each of which is adapted to record and read from the magnetizable medium; a source of signals to be recorded; means coupling the transducers in parallel across the source of signals to be recorded during a recording operation; an output circuit; and means coupled between said transducers and said output circuit for balancing the signal appearing across one of the transducers against the signal appearing across the other of the transducers, whereby substantially zero signal output appears in said output circuit during a recording operation and an output signal substantially representing the net difference between the signals appearing across said transducers appears in said output circuit during a reading operation.

8. In a magnetic recording system which is adapted to record selectively on a magnetizable medium and read previously recorded signals from the magnetizable medium, the combination of a pair of similar transducers; means providing relative motion between said transducers and said magnetizable medium; means selectively positioning each of said transducers in close proximity with said magnetizable medium; a source of signals to be recorded; means coupling the transducers in parallel across the source of signals to be recorded during a recording operation; a differential amplifier having a pair of signal input terminals, said differential amplifier being adapted to provide an output signal representing the net difference between signals applied to said input terminals; means coupling said transducers and said source of signals to be recorded to said differential amplifier, whereby said differential amplifier provides substantially zero signal output during a recording operation; and means uncoupling said source of signals from said transducers during a reading operation, whereby said differential amplifier provides an output signal substantially representing the net difference between the signals appearing across said transducers during a reading operation.

9. A magnetic reading and recording system including a plurality of pairs of transducers, each pair of transducers being adapted to record on and read from a magnetizable medium, means for effecting relative motion between said magnetizable medium and said plurality of pairs of transducers, means for causing said magnetizable medium and selected alternate ones of said pairs of transducers to be positioned in operative engagement for recording or reproducing information on said magnetizable medium, each pair of said plurality of pairs of transducers including a differential amplifier circuit, said differential amplifier circuit responding to signals from both transducers of a pair to provide an output signal which is a function of the difference in the signal across the transducers, whereby during reading operations the output signal from said differential amplifier is substantially free of noise and extraneous signals present in both transducers of a pair and during recording operations the output signal of said differential amplifier is substantially zero where recording signals of like amplitude are applied to both transducers of a pair.

References Cited in the file of this patent

UNITED STATES PATENTS

| | | |
|---|---|---|
| 2,359,489 | Proctor et al. | Oct. 3, 1944 |
| 2,539,876 | Von Behren | Jan. 30, 1951 |
| 2,628,346 | Burkhart | Feb. 10, 1953 |
| 2,690,913 | Rabinow | Oct. 5, 1954 |
| 2,713,676 | Fleming | July 19, 1955 |
| 2,827,622 | Guttwein | Mar. 18, 1958 |